Oct. 21, 1924.                                                  1,512,848
                            E. HEER
                        AUTOMOBILE SIGNAL
                    Filed April 18, 1922      2 Sheets-Sheet 1
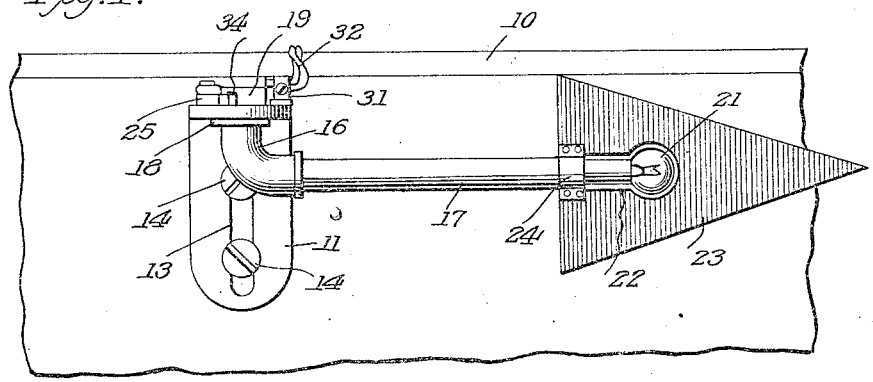
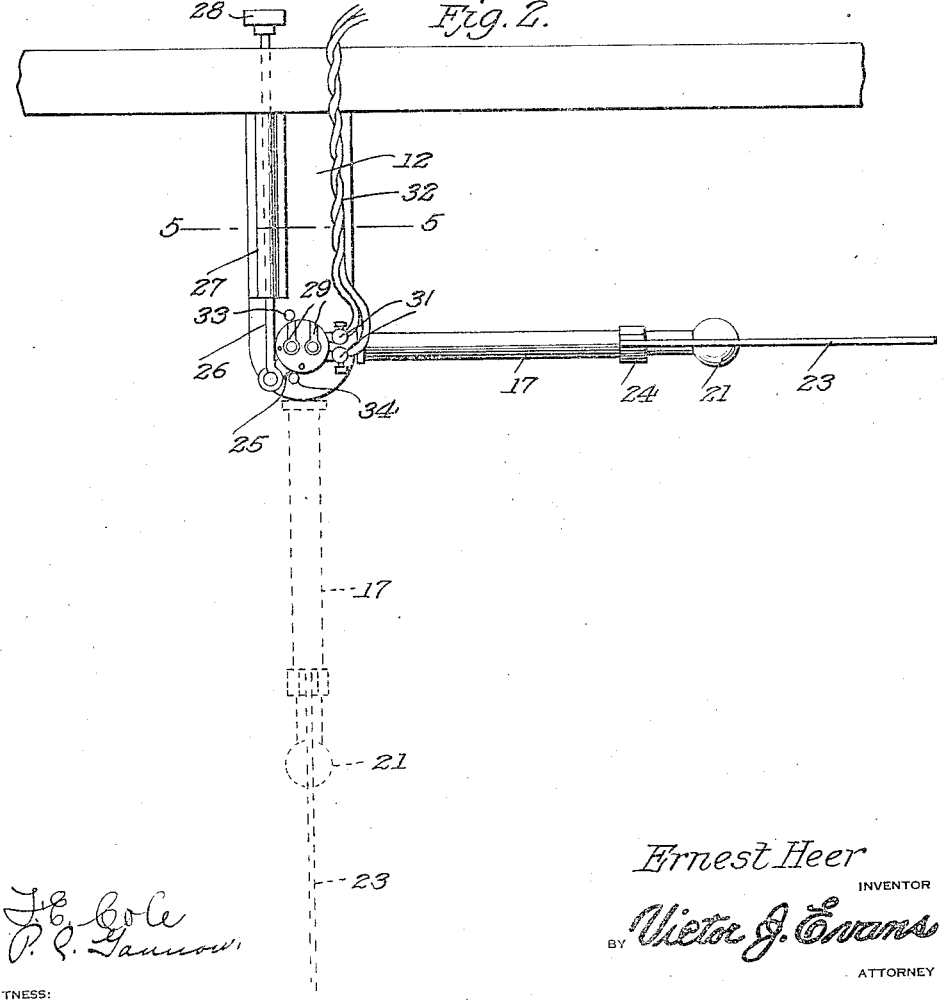
Ernest Heer
INVENTOR
BY Victor J. Evans
ATTORNEY
WITNESS:

Oct. 21, 1924.  
E. HEER  
AUTOMOBILE SIGNAL  
Filed April 18, 1922  
1,512,848  
2 Sheets-Sheet 2
Fig. 3.
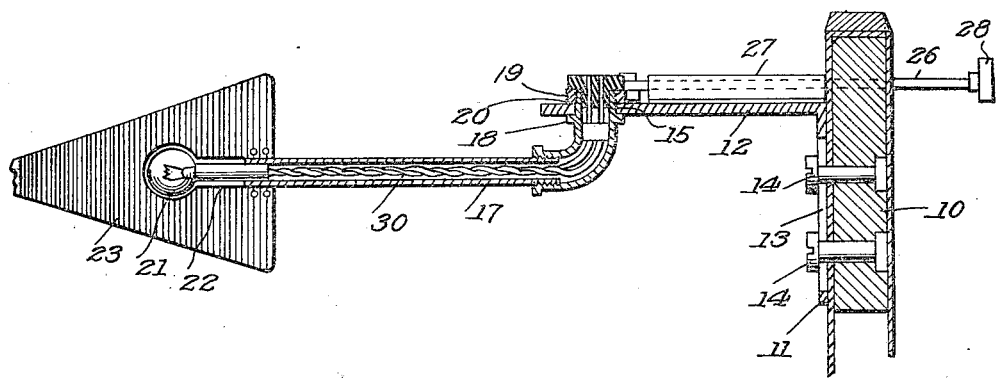
Fig. 4.
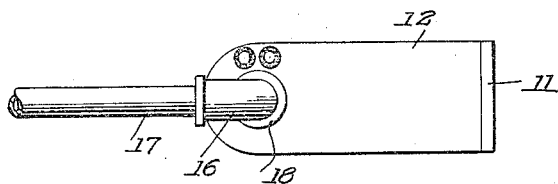
Fig. 5. Fig. 6.
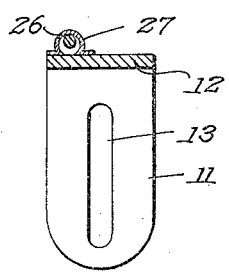
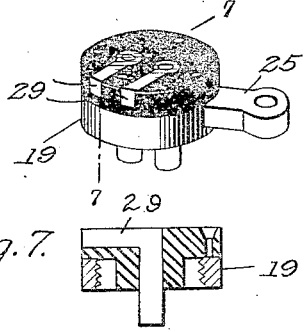
Fig. 7.
Ernest Heer  
INVENTOR  
BY Victor J. Evans  
ATTORNEY
WITNESS:

Patented Oct. 21, 1924.

1,512,848

UNITED STATES PATENT OFFICE.

ERNEST HEER, OF DUBUQUE, IOWA.

AUTOMOBILE SIGNAL.

Application filed April 18, 1922. Serial No. 554,380.

*To all whom it may concern:*

Be it known that I, ERNEST HEER, a citizen of the United States, residing at Dubuque, in the county of Dubuque and State of Iowa, have invented new and useful Improvements in Automobile Signals, of which the following is a specification.

This invention relates to improvements in signals and has special relation to direction signals for automobiles.

An object of the invention is the provision of a signal of the above character which may be conveniently operated to indicate a proposed change in direction or movement of a vehicle.

Another object of the invention is the provision of a direction signal which is novel in construction, simple and efficient in operation and which may be readily secured upon a vehicle in position for use.

With the above and other objects in view, the invention further includes the following novel features and details of construction, to be hereinafter more fully described, illustrated in the accompanying drawings and pointed out in the appended claims.

In the drawings:—

Figure 1 is a side elevation of a portion of an automobile with the signal applied and shown in normal position.

Figure 2 is a top plan view of the subject matter of Figure 1 with the signal shown swung out into signalling position by dotted lines.

Figure 3 is a section on the line 3—3 of Figure 2 with the signal extended in full lines.

Figure 4 is a fragmentary bottom plan view showing the outer end of the bracket and the adjacent portion of the signal arm.

Figure 5 is a section on the line 5—5 of Figure 2.

Figure 6 is a detail perspective view of the elbow cap.

Figure 7 is a detail sectional view taken on line 7—7 of Figure 6.

Referring in detail to the drawings, wherein like characters of reference denote corresponding parts, the reference character 10 indicates a portion of an automobile, to which the signal is shown as applied.

The signal comprises a bracket of annular formation which includes an attaching arm 11 and a supporting arm 12, the former being provided with an elongated slot 13 for the passage of screws or bolts 14, by means of which the bracket may be adjustably secured in position. The outer end of the arm 12 is provided with an opening 15 and positioned within this opening is one end of a tubular elbow 16, the latter comprising a portion of a substantially L-shaped signal arm 17. The elbow 16 is provided adjacent one end with an annular flange or collar 18 which provides a shoulder for engagement with the under face of the supporting arm 12 of the bracket. The adjacent end of the elbow is threaded and receives a threaded cap 19, having an annular shoulder 20 which engages the upper face of the supporting arm 12, so that the elbow 16 is swiveled within the opening 15 and the signal arm mounted for horizontal swinging movement.

The outer end of the signal arm has secured thereto an electric bulb 21 and this bulb and the adjacent end of the signal arm 17 is received within a slot 22 provided in the signal member 23, the latter being shown in the form of an arrow head. The signal member 23 is preferably colored red, while one half of the lamp 21, for example the half of the lamp which faces the rear of the automobile is colored red, while the opposite half is preferably colored green. The signal arm 17 is secured within the slot 22 through the medium of semi-circular flanged clamps 24, which are in turn secured to the adjacent side portions of the slot of the signal member 23.

The cap 19 of the elbow 16 carries a radially extending arm 25 and this arm is pivotally secured to one end of an operating rod or wire 26, which extends through an elongated semi-circular casing 27, secured to the supporting arm 12. The wire or rod 26 preferably extends through the side of the vehicle and is provided with an operating knob or button 28.

In addition, the cap 19 carries spaced contact members 29, which are connected to the terminals of the lamp 21 by conductor wires 30, while carried by the supporting arm 17 and arranged in the path of movement of the contacts 29 are stationary contacts 31. These last mentioned contacts may be connected by means of conductor wires 32 to a suitable source of current and the circuit thus formed may be provided with a suitable controlling switch (not shown).

Normally, the signal 23 is arranged substantially parallel with the vehicle and may be swung outward to an active or signalling position by a pull upon the operating rod or wire 26. This will rotate the inner end of the elbow 16 within the opening 15 and bring the contacts 29 into engagement with the contacts 31 to close a circuit through the lamp. Movement of the signal in this direction is limited by a stop 33, while a stop 34 limits the movement of the signal in an opposite direction.

The invention is susceptible of various changes in its form, proportions and minor details of construction and the right is herein reserved to make such changes as properly fall within the scope of the appended claims.

Having described the invention what is claimed is:—

1. An automobile signal of the character described comprising a substantially L-shaped supporting bracket having its vertical leg slotted and the horizontal leg apertured respectively, means provided for securing said vertical leg through said slot to the vehicle, an elongated semi-circular casing secured to the upper side of horizontal leg of said bracket, an L-shaped signal arm having its inner end flanged and threaded for insertion through the aperture in the horizontal leg of said bracket, a cap threaded to said end on the upper side of said bracket whereby a horizontal swinging movement is obtained, an arm radially extending from said cap and being substantially apertured, a rod extending through said semi-circular casing and connecting to the apertured end of said radially extending arm for the operation of the same, a signal secured to the outer end of said L-shaped signal arm whereby lateral movement of the operating rod will move the signal arm and signal to positions desired.

2. An automobile signal comprising an apertured support adapted for connection to an automobile body, an L-shaped swinging signalling arm having an upright portion journaled and secured in the aperture of the support, a crank connected with said upright portion of the L-shaped arm and disposed above the support and a rod connected to said crank and adapted to extend through a wall of an automobile to the interior thereof.

In testimony whereof I affix my signature.

ERNEST HEER.